Nov. 27, 1934.   P. E. STOGOFF   1,982,329
POWER CONTROL FOR INDUCTIVE LOAD
Filed June 29, 1932
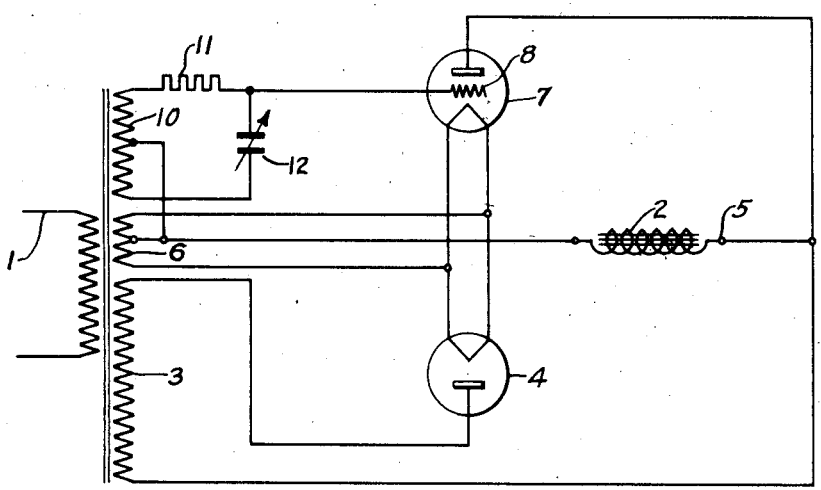
WITNESSES:
INVENTOR
Peter E. Stogoff
BY
ATTORNEY Patented Nov. 27, 1934

1,982,329

UNITED STATES PATENT OFFICE 1,982,329

POWER CONTROL FOR INDUCTIVE LOAD

Peter E. Stogoff, Wilkinsburg, Pa., assignor to Westinghouse Electric & Manufacturing Company, East Pittsburgh, Pa., a corporation of Pennsylvania Application June 29, 1932, Serial No. 619,954

9 Claims. (Cl. 175—363)

In the control of current for theater lighting systems, it is frequent practice to introduce an inductor between the source of alternating current and the lamps. In order to control the reactance introduced into the lamp circuit by this inductor an extra winding is provided and a direct-current transmitted through the extra winding, by more or less nearly saturating the iron, alters the reactance in the lamp circuit.

This invention relates to the control of direct current through an inductive load, and particularly, to the control of the direct current through such an extra winding when it is provided by rectifying alternating current.

This invention is an improvement upon the invention disclosed in the application of J. Ward Dawson, for improvement in Control systems for inductive loads, Serial No. 625,569, filed June 29, 1932, and assigned to the Westinghouse Electric and Manufacturing Company.

It is an object of my invention to provide a circuit for supplying an inductive load through a part-wave rectifier in which the time required to bring the current through the load to zero when necessary shall be smaller than has heretofore been required.

It is a further object of my invention to provide for the control of the current in an inductive load by a grid-controlled tube in shunt to said load.

It is a further object of my invention to combine the supply through a part-wave rectifier to an inductive load with a grid-controlled shunt about said load.

Other objects of my invention will be apparent from the following description and the accompanying drawing in which the single figure is a diagram of a circuit arrangement embodying my invention. In this arrangement a line 1 supplies current to an inductor 2 through a transformer comprising a secondary 3. One terminal of this secondary is connected to the anode of a rectifier tube 4 and the other terminal to one terminal 5 of the inductor. The opposite terminal of the inductor is connected to the cathode of the tube 4. The preferred way of doing this is by connecting the inductor to the center point of a secondary 6 on the same transformer. The terminals of the secondary 6 are connected to the terminals of the filament constituting the cathode of the rectifier 4. They are also connected to the terminals of a filament constituting the cathode of the tube 7, the anode of which is connected to the terminal 5 of the inductor 2.

The tube 7 is provided with a grid 8 which is connected with a source of potential, the phase of which may be controlled. One convenient way of providing this potential is to supply a third secondary 10 upon the same transformer. The terminals of the secondary 10 are connected respectively to a resistor 11 and a condenser 12. One of these elements is adjustable and both may be. They are connected in series and their junction point is connected to the grid 8.

The center point of the secondary 10 is connected to the cathode of the tube 7 preferably by connecting it at the mid-point of the secondary 6.

In the operation of the device when voltage in the secondary 3 is toward the anode of the tube 4, current flows through the inductor 2 toward the terminal 5. A field is thereby built up in the inductor. When the voltage in the secondary 3 is in the reverse direction there is current through the tube 4 but it is not supplied by the secondary 3. It is caused by the diminution of the field in the inductor 2.

This change of field produces an electromotive force in the inductor 2 which causes current to flow from the terminal 5 to the anode of the tube 7, through this tube to the point 6 and back to the inductor. This current delays the decay of the field in the inductor.

In the portion of the cycle during which the field in the inductor is diminishing, the electromotive force produced in the inductor tends to send a current through the secondary 3 and the tube 4. This current is opposed in sense to the electromotive force induced in the secondary 3 by the primary. This current will, therefore, continue only so long as the electromotive force produced by the inductor exceeds the electromotive force induced in the secondary 3 by the primary.

During this time, the inductor is supplying power to the line instead of receiving power from it. Throughout the remainder of the portion of the cycle during which the flux in the inductor is diminishing, current flows through the tube 7 provided that the potential of the grid 8 is such as to permit a flow of current. The control of the phase of the potential from the grid 8, therefore, determines during what portion of the time that the field in the inductor is diminishing its diminution will be retarded by the tube 7. The phase of the potential upon the grid 8 and therefore, the ratio of this time to the whole half-cycle may be controlled by adjusting the condenser 12.

It is also feasible to introduce into the control of the potential many of the expedients frequently used in the theater lighting art for presetting.

Although I have illustrated a tube as the rectifier in series with the inductive load, it is obvious that any suitable rectifier may be used. For example, a copper-oxide rectifier may be substituted for this tube rectifier whenever the currents are not too heavy.

Any inductive load may be supplied and controlled by the system here illustrated, but it is particularly advantageous in supplying the direct-current winding of a reactor of the type used for the control of lighting circuit, particularly in the illumination of theaters.

Many variations in detail will occur to those skilled in the art and an omission of the description thereof is not intended as a limitation. No limitation is intended except those expressed by the accompanying claims or required by the prior art.

I claim as my invention:

1. In combination, a source of alternating voltage, a rectifier, and an inductive load connected in series, a unidirectionally-conductive shunt about said load and phase-responsive means for controlling the conductivity of said shunt.

2. In combination, a source of alternating voltage, a rectifier, and an inductive load connected in series, a unidirectionally-conductive shunt about said load, the conductive direction in said shunt being away from the negative terminal of said load and means for limiting the conductivity of said shunt to a portion only of the half-cycles during which the voltage from said source is in the non-conductive direction relative to said rectifier.

3. In combination, a source of alternating voltage, a rectifier and an inductive load connected in series, a unidirectionally-conductive shunt about said load, the conductive direction in said shunt being away from the negative terminal of said load, means for limiting the conductivity of said shunt to a portion only of the half-cycles during which the voltage from said source is in the non-conductive direction relative to said rectifier, and adjustable means for determining said portion.

4. In combination, a source of alternating voltage, a rectifier, and an inductive load connected in series, a unidirectionally-conductive shunt about said load, grid-controlled means included in said shunt and means for impressing voltage upon the grid thereof, said means including a device for adjusting the phase of said voltage.

5. In combination, an inductor, means for establishing a current therethrough, additional means including a valve incorporating a control electrode associated with said inductor for retarding the decay of the field therein upon cessation of current supply thereto and means to cooperate with said control electrode for controlling the period during which said retarding means is active.

6. In combination, an inductor, means for supplying pulsating unidirectional current thereto, additional means cooperating with said inductor to retard the decay of the field therein in intervals between said pulsations, and means for controlling the time of action of said retarding means, whereby the portion of each of said intervals during which it acts is determined.

7. In combination, an inductor, means for supplying pulsating unidirectional current thereto, additional means cooperating with said inductor to retard the decay of the field therein in intervals between said pulsations, said retarding means including a grid-controlled device, means for impressing a potential upon the grid of said device and adjustable means for determining the phase of said grid potential.

8. In combination, an inductor, means including a source of alternating potential and a half-wave rectifier for supplying a pulsating unidirectional current to said inductor, other means cooperating with said inductor to retard the decay of the field therein in the intervals between said pulsation, said retarding means comprising a grid-controlled valve and an adjustable phase-shifting device controlling the phase of the potential upon the grid thereof.

9. In a circuit including a source of alternating potential, a rectifier and an inductor, means for constituting the whole inductor, a lag loop, said means comprising a valve connected across the inductor and means cooperating with said valve to determine during what portion of the cycle the lag loop shall be acting.

PETER E. STOGOFF.